Aug. 5, 1924.
H. S. BENNETT
OVERSHOE FOR TIRES
Filed Dec. 1, 1923
1,503,466
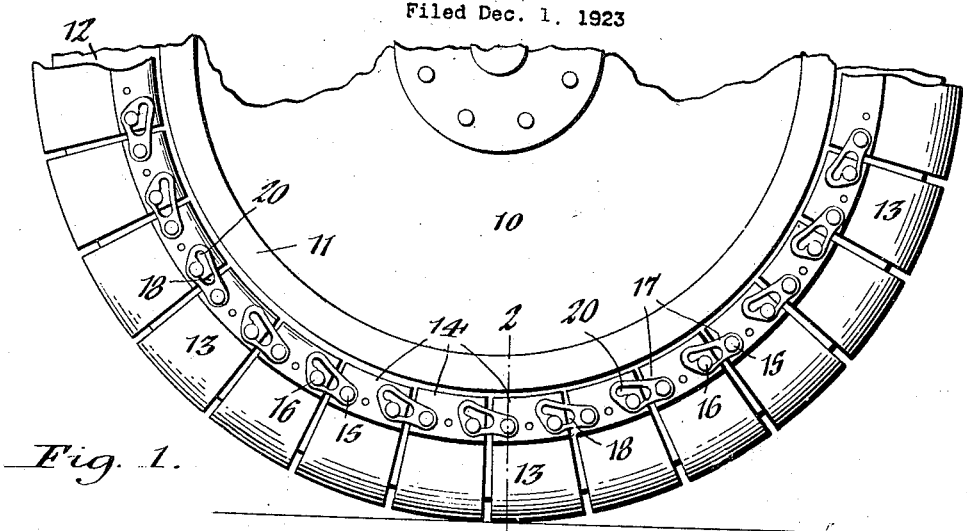
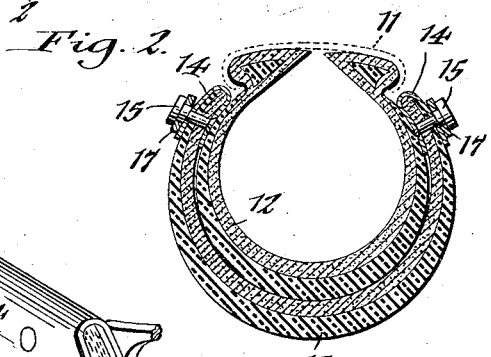
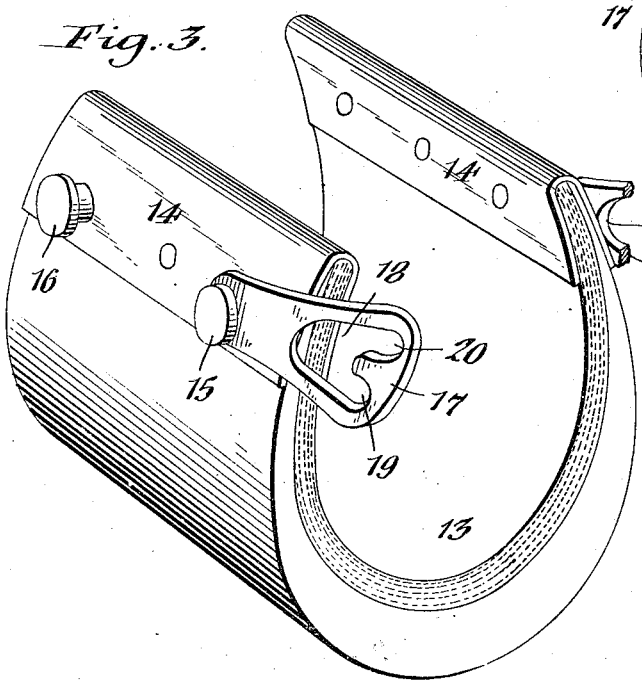
Inventor,
Herbert S. Bennett
by Geyer & Geyer
Attorneys.

Patented Aug. 5, 1924.

1,503,466

UNITED STATES PATENT OFFICE.

HERBERT S. BENNETT, OF JAMESTOWN, NEW YORK.

OVERSHOE FOR TIRES.

Application filed December 1, 1923. Serial No. 678,024.

*To all whom it may concern:*

Be it known that I, HERBERT S. BENNETT, a citizen of the United States, residing at Jamestown, in the county of Chautauqua and State of New York, have invented new and useful Improvements in Overshoes for Tires, of which the following is a specification.

This invention relates to an overshoe which is more particularly adapted for use on pneumatic tires.

Its chief object is to provide a sectional tire attachment of this character having novel means for flexibly and adjustably connecting the sections to one another, whereby they will independently yield or respond to any obstruction in the roadway and whereby they may be readily fitted to tires varying in size within certain limits.

Another object of the invention is to provide an overshoe tire embodying a plurality of identically constructed units or sections which are so connected that they may be readily replaced or renewed without disturbing or in any way interfering with the other sections.

A still further object is to provide a simple and inexpensive overshoe which will not only protect the tread and side portions of the tire from undue wear and punctures, but which will also add materially to the traction on the road and prevent skidding and spinning of the wheels.

In the accompanying drawings:

Figure 1 is a fragmentary side view of a vehicle wheel showing my invention applied thereto. Figure 2 is an enlarged cross section on line 2—2, Fig. 1. Figure 3 is an enlarged perspective view of one of the units or sections of the overshoe.

Similar characters of reference indicate corresponding parts in the several views.

The improvement, by way of example, is shown applied to a vehicle wheel 10 provided with the customary tire-retaining rim 11 and pneumatic tire 12.

The overshoe comprises a plurality of units or sections 13 connected in spaced relation in an annular series around the tire and preferably cut in equal lengths made from blemished tire casings or other appropriate material which will form a protective covering for the tire. As shown in Figs. 2 and 3, the usual clencher or beaded portions of the sections are removed, leaving sufficient material so that these sections cover and snugly fit the tread and side portions of the tire. The inner edges and adjoining side portions of the sections are preferably covered with substantially U-shaped reinforcing strips 14 of metal which may be riveted or otherwise secured thereto, said strips being shaped to conform to the contour of the sections, as shown in Fig. 2.

The several overshoe-sections are adjustably connected in such a way that they are independently flexible, being permitted to rock more or less in a direction circumferentially of the tire. To this end, each section is provided on opposite sides and near the ends thereof with outwardly-facing transverse pivot pins or studs 15, 16, which are riveted or otherwise fastened to the corresponding reinforcing strip 14. Mounted on each of the studs 15 to swing radially of the tire is a link 17 which is provided at its free end with an opening 18 adapted to be pivotally connected with the stud 16 of the adjoining overshoe section. Said link-opening 18 is somewhat larger at its inner end than the head of the stud 16 in order to enable the link to be applied to and removed from the stud by passing it over the same. At its outer end, such link-opening is provided with a pair of notches 19, 20, which communicate with the latter, as shown in Figs. 1 and 3, and with one or the other of which the shank of the stud 16 is adapted to engage. The bottoms of these notches are located at different distances from the pivotal axes of the respective links, whereby the overshoe sections may be adjusted to increase or decrease the diameter of the overshoe so as to adapt it to tires of different sizes within certain limits. While each connecting link is shown as having two of such notches, any number of them may be employed, if desired.

In the position of the parts shown in Fig. 1, the overshoe is fully contracted to its minimum diameter, with the notches 19 of the links 17 in engageemnt with the studs 16 of the sections 13. To adapt this overshoe with a like number of sections to a tire slightly larger in diameter, it is only necessary to adjust the links to bring their notches 20 in engagement with the studs 16 which operation accordingly increases the diameter of the overshoe. Should the overshoe become loose on the tire, due to wear, this slackness may be readily taken up by adjusting one or more of the links in such a manner that the overshoe would be accordingly reduced in diameter. In adapting this overshoe to tires still smaller or larger in diameter, one or more of the sections 13 may be obviously removed or inserted.

In effecting an adjustment of two adjoining sections 13 to either decrease or increase the diameter of the overshoe, the respective sections are brought together through the instrumentality of an appropriate tool engaged with the stud 15 of one section and the opposing stud 16 of the adjacent section. This will withdraw the stud 16 from its notch in the respective link 17 and thereby permit the latter to be swung in the desired direction to bring the other notch in position to be engaged by said stud when the sections return to their initial position upon removal of the tool.

The removal of a worn section may be readily effected while the overshoe is in position on the tire. This may be accomplished by drawing those sections adjoining the worn section toward the latter in the manner previously described, disengaging the links of the worn sections from the opposing studs 16 of one of the adjoining sections, and then disengaging the links of the other adjoining section from the opposing studs of the worn section. The new section can then be applied to the tire by engaging its links with the opposing studs 16 of an adjoining section and engaging the links of the other adjoining section with the studs of said new section. In connecting and disconnecting the links to and from their studs during the act of applying or removing a section, it is necessary to slightly flex the sides of the latter to permit the openings 18 of the links to pass over the stud-heads.

By constructing an overshoe of a plurality of individual sections and linking them in the manner shown and described, no separate or removable fastenings are required for effecting adjustment or removal and replacement of the sections. Furthermore, the pivotal connection of the sections renders them independently flexible and responsive to shocks incident to obstructions encountered on the roadway. Aside from these advantages, this improved overshoe, by taking the wear off the tire, prolongs the life of the latter, it renders the same puncture proof, and prevents skidding.

I claim as my invention:

1. An overshoe for tires, comprising a plurality of sections arranged in an annular series about the tire, pivot pins carried by said sections, and links pivotally connecting said sections with one another, each link being permanently mounted on the pivot pin of one section and detachably engaging the opposing pivot pin of an adjoining section.

2. An overshoe for tires, comprising a plurality of sections arranged in an annular series about the tire, and links pivotally connecting said sections with one another, each link being permanently connected at one end to one section while its other end is detachably connected to an adjoining section and constructed to permit circumferential adjustment of said sections.

3. An overshoe for tires, comprising a plurality of sections arranged in an annular series about the tire, pivot pins carried by said sections, and links engaging the opposing pins of adjoining sections, one end of each link having a series of notches with one or another of which its companion pivot pin in adapted to engage.

4. An overshoe for tires, comprising a plurality of sections arranged in an annular series about the tire, and links pivotally connecting said sections with one another, one end of each link having radially-disposed internal notches, one or another of which is arranged to engage the pivot of an adjoining section.

5. An overshoe for tires, comprising a plurality of sections arranged in an annular series about the tire, pivot pins having heads carried by said sections, and adjustable links engaging said pivot pins and connecting said sections with one another, one end of each link being detachable from its pivot pin and having an opening therein for receiving the pivot pinhead, said link having notches communicating with said opening and with one or another of which the shank of the companion pivot pin is adapted to engage.

6. An overshoe for tires, comprising a plurality of tire sections free from clencher portions and arranged in an annular series about the tire, reinforcing strips applied to the inner edges and adjoining side portions of said sections, and links pivotally connecting said sections with one another.

7. An overshoe-section of the character described, having a pair of pivot pins at its opposite sides, and a link permanently mounted on one of said pivot pins of a pair and adapted to detachably engage one of the pivot pins of an adjoining section, the detachable end of said link having an opening and notches communicating with said opening.

8. An overshoe-section of the character described, having a pair of pivot pins at one side thereof, and a link mounted on one of said pivot pins and adapted to detachably engage one of the pivot pins of an adjoining section, the detchable end of said link having an opening and notches communicating therewith, said notches being located at different distances from the pivotal axis of the link.

HERBERT S. BENNETT.